FIP8212 OR 3,803,406

250/201

United States Patent [19]

Richter

[11] 3,803,406

[45] Apr. 9, 1974

[54] OPTICAL GUIDING APPARATUS COMPRISING AN OPTICAL TRANSMISSION PATH, LOGIC CIRCUITRY AND A PULSE TRANSMISSION LINE ALONGSIDE THE OPTICAL PATH

[75] Inventor: Paul S. Richter, Darien, Conn.

[73] Assignee: Bell Telephone Laboratories, Incorporated, Murray Hill, Berkeley Heights, N.J.

[22] Filed: Aug. 29, 1968

[21] Appl. No.: 756,092

[52] U.S. Cl. ................. 250/201, 250/208, 250/209, 350/96 WG

[51] Int. Cl. ............................................ G01j 1/20

[58] Field of Search ...... 250/201, 208, 199; 350/96, 350/57

[56] References Cited

UNITED STATES PATENTS

| | | | |
|---|---|---|---|
| 3,466,111 | 9/1969 | Ring | 350/96 |
| 3,323,408 | 6/1967 | Bishop et al. | 250/201 |
| 3,442,574 | 5/1969 | Marcatili | 350/179 |

*Primary Examiner*—Archie R. Borchelt
*Assistant Examiner*—D. C. Nelms
*Attorney, Agent, or Firm*—W. L. Wisner

[57] ABSTRACT

In the automatically controlled optical guiding apparatus disclosed, a coordinated series of light beam position corrections is achieved and stability assured by digital logic circuitry and a pulse transmission line paralleling the guiding apparatus. Actuation of the control circuitry for a light beam repositioning element is enabled by the arrival of a pulse at a logic gate associated with that element and with a set of sensors controlling that element. If actuation occurs, either a new pulse is started down the transmission line or the enabling pulse is reinjected at the same point in the line to complete its transit of the line. If no actuation occurs, the pulse continues to propagate down the line.

2 Claims, 2 Drawing Figures

INVENTOR
P. S. RICHTER
BY Wilford L. Wisner
ATTORNEY

OPTICAL GUIDING APPARATUS COMPRISING AN OPTICAL TRANSMISSION PATH, LOGIC CIRCUITRY AND A PULSE TRANSMISSION LINE ALONGSIDE THE OPTICAL PATH

BACKGROUND OF THE INVENTION

This invention relates to optical guiding apparatuses in which the light beam position is automatically controlled.

Communication employing modulated laser beams is the subject of a substantial amount of theoretical and applied research. The potential communication bandwidth, and hence the total communication capacity, possessed by coherent radiation in a light beam is much greater than that of any existing communication facility. Gradually, many components usable in a communication system employing coherent light have been discovered and developed.

One of the persistent problems remaining as an obstacle to feasible optical communication systems is the lack of a sufficiently reliable transmission system for the modulated optical beam. In unguided transmission systems, snow, rain and fog degrade transmission reliability. In guided transmission, earth movements and variations in ambient temperature gradients can also degrade transmission reliability. In this context, guided transmission refers to protected transmission in an enclosing conduit, and does not imply operation analogous to that of a microwave guide. Typically, the transverse dimensions of the conduit are many times the wavelength of light being transmitted. Reflections at the conduit walls are generally undesirable because sufficiently smooth internal surfaces would be too costly. As a result, many arrangements have been proposed for keeping the beam away from the conduit walls, even in the presence of disturbances.

One of these arrangements is described in the article "Self-Aligning Optical Beam Waveguides" by Messrs. Christian, Goubau and Mink, *IEEE Journal of Quantum Electronics*, *QE* 3, p. 498 (November, 1967). Coordination of the corrections and overall stability of the system are assured by a programming unit that sequentially moves successive sets of sensors into the fringes of the desired beam path and concurrently enables the corresponding stepping motor circuitry to respond to any over-threshold light beam position errors that are sensed.

Such a remote programming unit requires separate connections to all of the sensor circuits and all of the motor drive circuits. These separate connections are impractical for a long-distance communication system. They would require cables with more numerous conductors and interconnections more complex than existing long-distance telephone facilities.

Another control arrangement is proposed in the concurrently-filed patent application of J. C. Daly, (Case 1) Ser. No. 756,273, filed Aug. 29, 1968 and assigned to the assignee hereof. In that arrangement, the necessity for separately-wired programmed coordination is eliminated either by the simplicity and quickness of response obtained by permitting each lens of beam repositioner to have only two positions, or by localizing the beam position corrections so that transient effects do not propagate appreciable distances in either direction in the optical guiding apparatus.

Nevertheless, it is desirable to have alternatives that permit wider variations of positions of the repositioning elements and that do not require each set of sensors to supply signals to different, substantially separated beam repositioners. Greater flexibility of control arrangements would thereby be provided for future optical communication systems. Any feasible alternatives should avoid separate connections for programmed coordination of the beam position corrections and should be as fast as possible.

SUMMARY OF THE INVENTION

According to my invention, sequential coordination of light beam position corrections in an optical guiding apparatus is achieved by a pulse transmission line and logic circuits which couple the pulse transmission line to the control circuitry of the respective beam repositioning elements. Actuation of the control circuitry for a light beam repositioning element is enabled by the arrival of a pulse at a logic gate connected between that element and the set of sensors that generate the control signal for that element. Actuation occurs only if an error signal is present at that logic gate.

In a preferred embodiment, if actuation occurs, a new pulse is started from the beginning of the transmission line. Nevertheless, a feasible modification of my invention involves re-injecting the pulse into the transmission line after each correction is enabled, so that the pulse completes its transit of the line. If no actuation occurs, the pulse continues to propagate down the line until it arrives at a logic gate at which an error signal is present.

BRIEF DESCRIPTION OF THE DRAWING

Further features and advantages of my invention will become apparent from the following detailed description taken together with the drawing, in which.

DESCRIPTION OF THE ILLUSTRATIVE EMBODIMENTS

Figure 1:
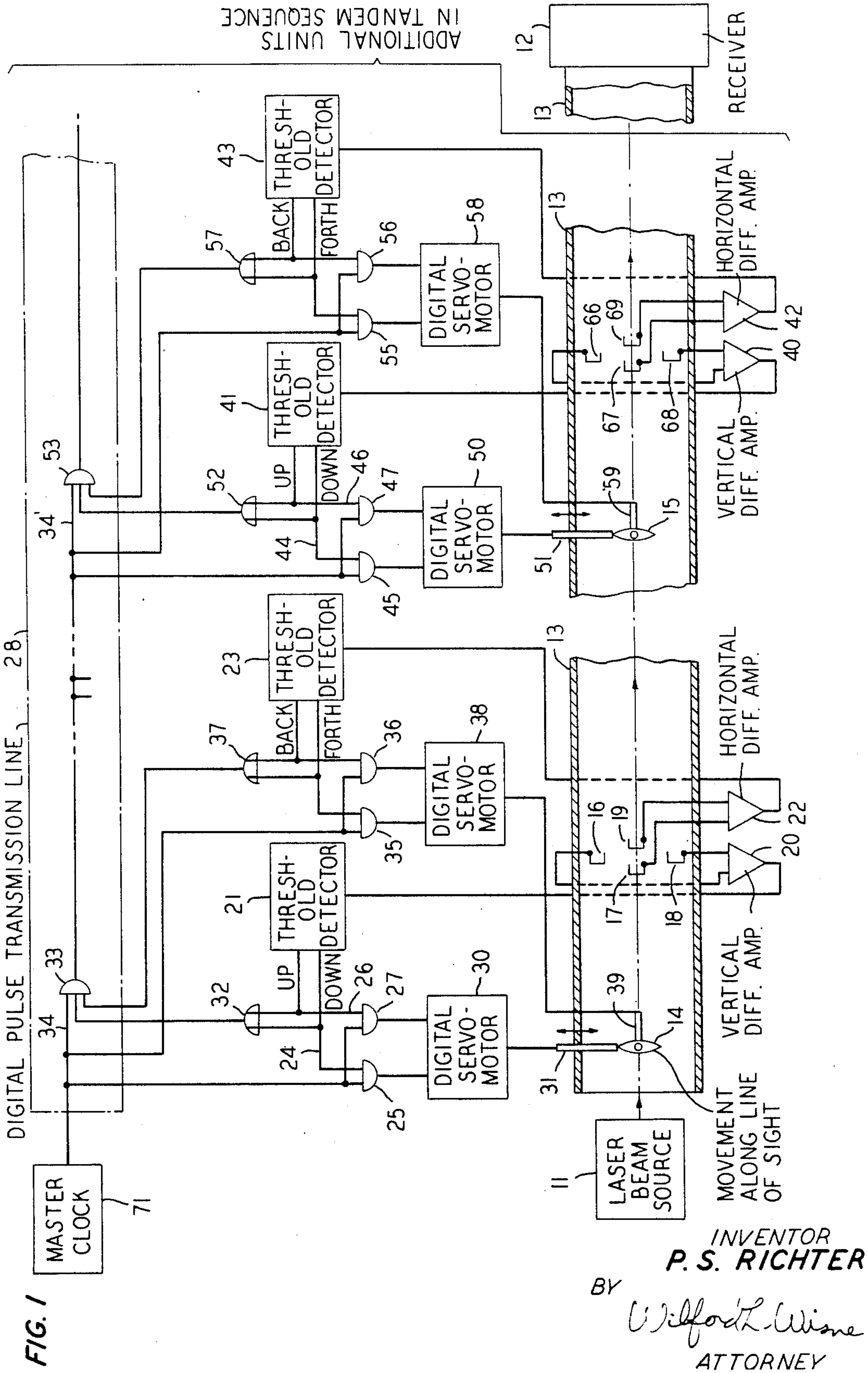
FIG. 1 is a partially schematic and partially block diagrammatic illustration of a preferred embodiment of the invention.

In the embodiment of FIG. 1, it is desired to transmit a modulated laser beam from a source 11 to a remote receiver 12 for communication purposes. To avoid the unpredictability of the atmosphere and the weather, transmission occurs in a protective conduit 13, illustratively copper, which has an internal diameter many times the wavelength of the light beam being transmitted.

For purposes of illustration, it will be assumed that the lenses 14 and 15, which serve to focus the laser beam to keep it from spreading to intercept the conduit walls, are also movably mounted so that they may serve as light beam repositioning elements. That is, they may be positioned to bend the beam so that it does not strike the guide walls. The need for such light beam repositioning may be occasioned by movements of the earth in which conduit 13 is buried, or by changes in temperature gradients. While conduit 13 will be buried as deeply as possible to minimize changes in temperature gradients and local traffic disturbances, certain residual disturbances are hard to eliminate and can be compensated for by means of movement of light beam repositioning elements, for example, the movable lenses 14 and 15.

Illustratively, a set of photosensors 16, 17, 18 and 19 are positioned symmetrically about the guide axis at a given axial position downstream from lens 14 to sense both horizontal and vertical positions of the light beam. Illustratively, the sensors include photodiodes on rigid mounts extending from the guide wall and also include reflectors (not shown), similarly mounted in a position to intercept a small portion of the fringe of a properly positioned light beam propagating in the guides and focus it on the photodiode. The vertical position-sensing sensors 16 and 18 are connected to the inputs of a difference amplifier 20. The output of amplifier 20 is an indication of the magnitude and sense of the vertical light beam deviation. The output of amplifier 20 is therefore connected to the input of a so-called threshold detector 21 which tells whether the error is in excess of a tolerable "threshold" level. Similarly, horizontal beam position-sensing sensors 17 and 19 are connected to the inputs of difference amplifier 22, the output of which is connected to the threshold detector 23.

One output of threshold detector 21 on lead 24 is indicative of an excessive upward beam deviation. Therefore, for a needed downward adjustment of the lens 14, lead 24 is connected to one input of AND gate 25. The output of threshold detector 21 that is indicative of an excessive downward beam deviation and needed upward movement of lens 14 is connected via lead 26 to AND gate 27. The other inputs of AND gates 25 and 27 are connected to the conductor 34 of the main transmission path of digital pulse transmission line 28, which parallels conduit 13 and is connected to master clock 71, the source of the coordinating pulses. The outputs of AND gates 25 and 27 are connected to the digital servomotor 30 to drive it to move lens 14 through its mounting 31 downward and upward, respectively. The leads 24 and 26 are also connected to the two inputs of NOR gate 32. The output of NOR gate 32 is connected to one input of an AND gate 33 in digital pulse transmission line 28. Also connected to inputs of AND gate 33 are the main transmission lead 34 of line 28 and the output of NOR gate 37 in the horizontal control circuitry.

Similarly, for the horizontal control circuitry, respective outputs of threshold detector 23 are connected to inputs of AND gates 35 and 36 which also have inputs connected to lead 34 of line 28. The two outputs of threshold detector 23 are also connected to the inputs of NOR gate 37. The outputs of AND gates 35 and 36 are connected to the inputs of digital servomotor 38 to drive the lens 14 respectively toward the viewer or away from the viewer of the drawing along a horizontal axis transverse to conduit 13. The portion of the mounting means associated with horizontal movement of lens 14 is represented by the mounting element 39.

The control circuitry for lens 15 is precisely analogous to that of lens 14; and its components are numbered by numbers twenty digits higher, except for the sensors which are numbered 50 digits higher. It should be particularly noted that AND gate 53 is the next digital unit in pulse transmission line 28 and is organized like the preceding AND gate 33 in the sense that the continuing main lead 34′ of transmission line 28 is the output of AND gate 33 and is one input of AND gate 53. The other inputs of AND gate 53 are the outputs of NOR gates 52 and 57. Additional control units like those described above appear in tandem sequence along the conduit 13 and the digital pulse transmission line 28 until the light beam reaches receiver 12.

The operation of the embodiment of FIG. 1 with respect to its novel aspects will now be described In operation, the photosensors, for example, photosensors 16, 17, 18 and 19, provide outputs which are indicative of the magnitude and sense of beam deviation from the nominal axis of the sensors. Since the sensors are fixed with respect to conduit 13, the sensor axis is also the axis of conduit 13. The symmetrical threshold detectors 21, 23 observe the relative balance of the signals from the sensors and provide "0" or "1" logic outputs depending upon the direction and magnitude of any imbalance. Meanwhile, a master clock 71 provides periodic pulses to the main lead 34 of transmission line 28. The logic outputs from threshold detector 21, for example, are used to steer the clock pulses from clock 71 to operate the servomotor 30 to position lens 14 in the proper direction to achieve correction when the error threshold has been exceeded. The steering includes, not only the enabling of either AND gate 25 or AND gate 27 in response to an error, but also the removal of output signal from NOR gate 32, so that AND gate 33 is blocked. As a result, a clock pulse that helps drive a servomotor is not permitted to propagate farther in transmission line 28.

If, however, no beam position error threshold has been exceeded in the vertical direction, then both inputs of NOR gate 32 are inactive and an enabling signal is supplied to the input of AND gate 33. Also, AND gates 25 and 27 are blocked. If, similarly, no threshold has been exceeded in the horizontal direction as detected by threshold detector 23, the inputs to NOR gate 37 are also inactive and another enabling signal is supplied to the third input of AND gate 33. AND gates 35 and 36 are blocked. Thus, the clock pulse from clock 71 is allowed to pass from lead 34 through AND gate 33 to lead 34′, propagating farther down transmission line 28 until a position is reached at which correction is required.

Let us now examine in more detail the operation involved in making a correction. Assume that an excessive upward deviation of the light beam has been sensed by sensors 16 and 18 and that threshold detector 21 has an 1 output on lead 24. When a pulse from clock 71 arrives at the other input of AND gate 25, AND gate 25 produces an output signal to digital servomotor 30 which tends to drive lens 14 in the downward direction. Similarly, a signal is passed through lead 26 and the AND gate 27 when an excessive downward deviation of the beam has been detected by sensors 16 and 18. The presence of a 1 signal on lead 26 or lead 24 disables NOR gate 32 so that AND gate 33 does not pass the pulse farther down the transmission line. No pulse is then passed to lead 34′ until a new pulse has been generated by clock 71 and successfully passed by AND gate 33. Thus, a correction of the light beam position at a given point in conduit 13 can be achieved only when the beam position at preceding points in conduit 13 has been determined not to exceed a threshold deviation.

It should, of course, be apparent that in a system in which downstream deviations might become excessive with this pulse blocking operation, AND gates 33 and 53 can be replaced by circuitry which regenerates the pulse and reinjects it into the line after it has actuated a servomotor or which otherwise passes it on down transmission line 28 in advance of any new pulse from clock 71.

The operation of the circuitry controlling lens 15 as a beam repositioning element is substantially identical to the circuitry just described.

It should be particularly noted in connection with the operation of the embodiment of FIG. 1 that the only coordination of the different control apparatuses at successive points along conduit 13 is provided by master clock 71 together with transmission line 28 and that, most importantly, this arrangement requires only a single transmission line and does not require separate connections to all control apparatuses from a common central point or programming unit.

Thus, the field installation of this apparatus is vastly simpler and less expensive than would be entailed by the apparatus disclosed in the above-cited article by Christian, Goubau and Mink. Moreover, it is characteristic of digital pulse transmission lines that the propagation delays are very small. Most disturbances for which corrections are needed occur over periods of several minutes or longer, so that it is entirely feasible to block, that is, remove from the line, a pulse that has activated a control unit and to wait for the next pulse from master clock 71. This mode of operation tends to reduce control transients in the guide.

Figure 2:
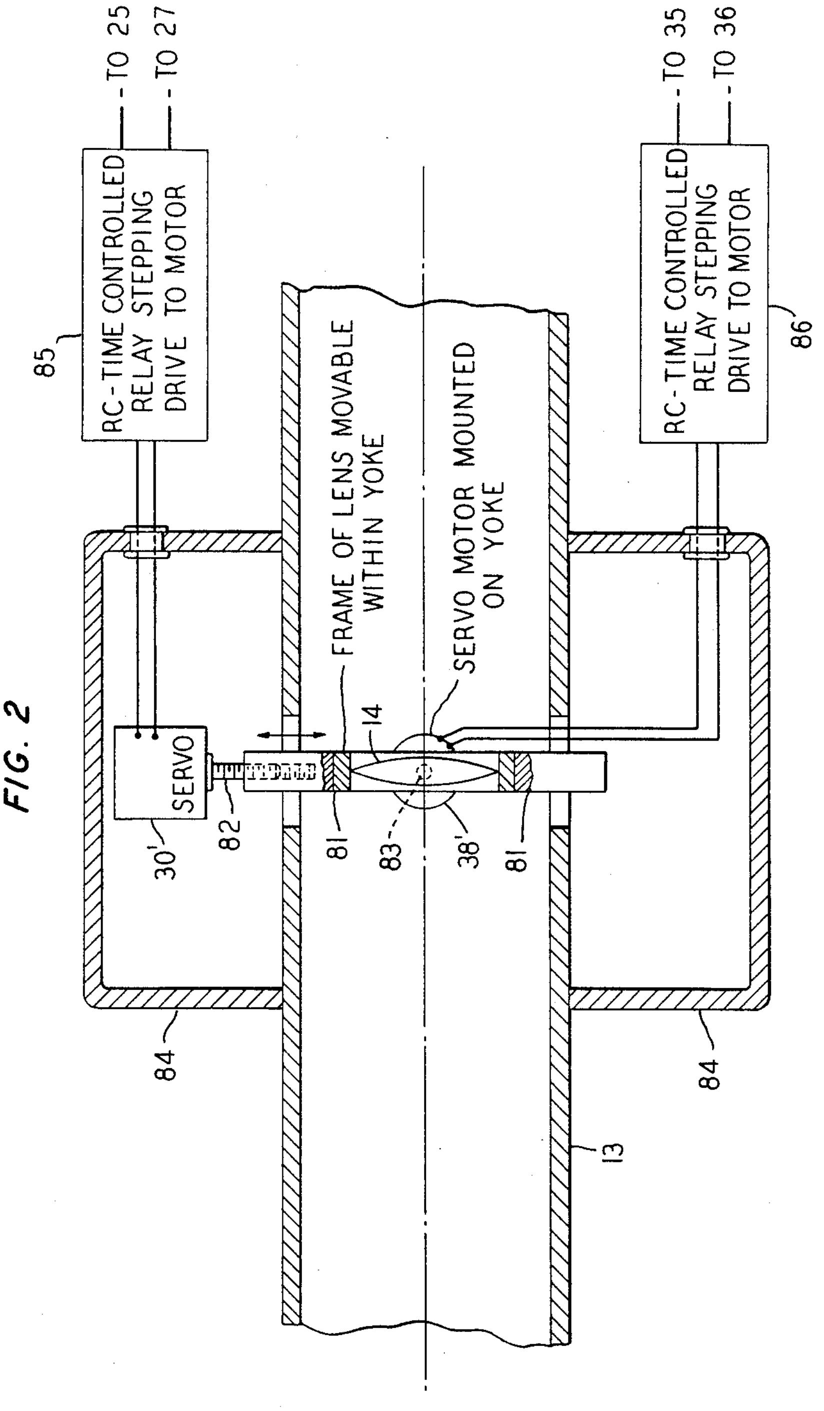
FIG. 2 is a pictorial cross-sectional view of the drive arrangement for a typical beam-repositioning element.

An illustrative arrangement for combined vertical and horizontal movement of a beam repositioning lens 14 transverse to the conduit axis, is illustrated in FIG. 2. The conduit 13 is provided with a small gap through which passes a yoke 81 in which lens 14 is mounted. Yoke 81 is provided with an internally threaded portion in which fits the vertical drive screw 82, which is driven by the stationary servomotor 30'. The frame of the lens 14, shown through a partial section of yoke 81, is internally threaded to receive horizontal drive screw 83. Horizontal drive screw 83 is driven by servomotor 38' which is mounted on the yoke 81. To prevent stray light, dirt and moisture from entering conduit 13, the yoke 81, the servomotors 30' and 38' and the associated drive screws are mounted within a protective housing 84 which effectively bridges the gap in conduit 13 as well as enclosing the mechanical apparatus. Although seen in cross section, the housing 84 would typically assume a rectangular, box-type shape around conduit 13. The electrical drive leads for the servomotors 30' and 38' pass through appropriate sealed apertures in the housing 84 and are connected to the inputs of the servomotors.

The servomotors 30' and 38' in FIG. 2 embody an alternate scheme for achieving digital servomotor action, i.e., a stepping action. Specifically, specially adapted input circuitry for the servomotors is illustrated to emphasize the great variety of drive arrangements which might be employed. Thus, servomotors 30' and 38' need not be digital servomotors in the usual sense. Instead, they may be less expensive servomotors which are driven through a drive circuit 85 or 86, respectively, which provides pulses to the servomotor input leads, so long as the beam position deviation exceeds threshold. Thus circuitry 85 would be actuated from AND gates 25 and 27 of FIG. 1; and drive circuitry 86 would be actuated from AND gates 35 and 36 of FIG. 1. These drive circuits would include a relay energized from a resistance-capacitance circuit having a specified decay time constant or other stepping device to generate periodic pulses which are supplied to the servomotor input leads. Many relay circuits are known for generating periodic pulses at rates controlled by the time constant of an RC (resistance-capacitance) timing circuit. The pulses are generated only so long as a light beam position error persists.

Numerous modifications of my invention should be apparent to those skilled in the art. For example, various other pulse transmission lines could be employed. One such line would be an active line employing periodic amplification of the pulses. The main conductor could be incorporated into a coaxial cable or a strip line.

It should be noted that the beam repositioning elements in the embodiment described above could be movable prisms or reflectors instead of movable lenses. The preferable mode of movement of prisms or reflectors may be rotation instead of lateral translation.

I claim:

1. An optical guiding apparatus of the type comprising a conduit through which a beam of optical radiation is to be transmitted, a plurality of means disposed within said conduit for repositioning said beam within said conduit in response to respective actuation signals, a plurality of means disposed in said conduit for sensing transverse position errors of said beam at a plurality of axial locations in said conduit, and means for coupling each of said sensing means to one of said repositioning means to coordinate the repositioning of said beam, including a source of periodic pulses, a pulse transmission line paralleling said conduit and supplied with said pulses, means for transmitting signals from each sensing means, and a plurality of means each coupled respectively to said transmission line at one of a set of spaced points and to one of said signal transmitting means for applying said actuation signals to each of said repositioning means upon the simultaneous occurrence of a signal from the coupled sensing means and the presence of a pulse at the respective point in said pulse transmission line, said actuation signal applying means being coupled back to the pulse transmission line to block further passage of the pulse in said transmission line upon application of said actuation signal to said repositioning means.

2. An optical guiding apparatus of the type comprising a conduit through which a beam of optical radiation is to be transmitted, a plurality of means disposed within said conduit for repositioning said beam within said conduit in response to respective actuation signals, a plurality of means disposed in said conduit for sensing transverse position errors of said beam at a plurality of axial locations in said conduit, and means for coupling each of said sensing means to one of said repositioning means to coordinate the repositioning of said beam, including a source of periodic pulses, a pulse transmission line paralleling said conduit and supplied with said pulses, means for transmitting signals from each sensing means, and a plurality of means each coupled respectively to said transmission line at one of a set of spaced points and to one of said signal transmitting means for applying said actuation signals to each of said repositioning means upon the simultaneous occurrence of a signal from the coupled sensing means and the presence of a pulse at the respective point in said pulse transmission line, said actuation signal applying means being coupled back to the pulse transmission line to block further passage of the pulse in said transmission line upon application of said actuation signal to said repositioning means, the sensing means being disposed in fixed position with respect to the conduit and the repositioning means being adapted to move in discrete steps in response to the signals from said sensing means.

* * * * *